United States Patent
Pye et al.

(10) Patent No.: US 6,503,318 B2
(45) Date of Patent: Jan. 7, 2003

(54) CONDUCTIVE CONCRETE COMPOSITION

(75) Inventors: Glendon B. Pye, Orleans (CA); Robert E. Myers, Greely (CA); Mark R. Arnott, Nepean (CA); James J. Beaudoin, Gloucester (CA); Peter J. Tumidajski, Toronto (CA)

(73) Assignee: National Research Council of Canada, Ottawa (CA)

( * ) Notice: Subject to any disclaimer, the term of this patent is extended or adjusted under 35 U.S.C. 154(b) by 33 days.

(21) Appl. No.: 09/818,757

(22) Filed: Mar. 28, 2001

(65) Prior Publication Data

US 2001/0052307 A1 Dec. 20, 2001

Related U.S. Application Data

(60) Provisional application No. 60/192,850, filed on Mar. 29, 2000.

(51) Int. Cl.$^7$ ................................................ C04B 24/00
(52) U.S. Cl. ................ 106/716; 106/644; 106/717; 106/723; 252/502; 252/510; 264/333; 264/DIG. 43
(58) Field of Search ................................ 252/502, 510; 106/716, 723, 717, 644; 264/333, DIG. 43

(56) References Cited

U.S. PATENT DOCUMENTS

| | | | |
|---|---|---|---|
| 3,166,518 A | * | 1/1965 | Barnard |
| 3,607,234 A | * | 9/1971 | Kawawa et al. |
| 3,626,149 A | * | 12/1971 | Carney et al. |
| 3,802,898 A | * | 4/1974 | Laurent et al. |
| 3,903,349 A | * | 9/1975 | Thorpe et al. |
| 3,923,531 A | * | 12/1975 | Parsons et al. |
| 3,962,142 A | * | 6/1976 | Freeman et al. |
| 4,063,944 A | * | 12/1977 | Behring |
| 4,069,870 A | * | 1/1978 | Gallus .......................... 166/293 |
| 4,114,692 A | * | 9/1978 | Gallus .......................... 166/293 |
| 4,219,519 A |   | 8/1980 | Goksel |
| 4,957,555 A | * | 9/1990 | Wheeler et al .............. 106/726 |
| 5,226,961 A | * | 7/1993 | Nahm et al. ................. 106/692 |
| 5,346,547 A |   | 9/1994 | McCormack |
| 5,362,324 A |   | 11/1994 | Cerulli et al. |
| 5,362,829 A |   | 11/1994 | Kinoshita et al. |
| 5,422,174 A | * | 6/1995 | Shintari et al. |
| 5,447,564 A |   | 9/1995 | Xie et al. |
| 5,654,352 A | * | 8/1997 | MacDonald |
| 5,753,037 A |   | 5/1998 | Drs et al. |
| 5,854,318 A |   | 12/1998 | Tahara et al. |
| 5,880,185 A |   | 3/1999 | Minomiya et al. |
| 5,908,584 A | * | 6/1999 | Bennett ....................... 252/582 |

FOREIGN PATENT DOCUMENTS

| | | | |
|---|---|---|---|
| DE | 19525022 | * | 1/1977 |
| FR | 2382991 A | | 10/1978 |
| IN | 78389 | * | 1/1964 |

OTHER PUBLICATIONS

Pugachyov G.A. et al., Chemical Abstracts, vol. 121, No. 12, (Sep. 19, 1994) Abstract No. 140183d; "Electrically conductive concrete with added superplasticizer S–3".

* cited by examiner

*Primary Examiner*—Paul Marcantoni
(74) *Attorney, Agent, or Firm*—Birch, Stewart, Kolasch & Birch, LLP (57) ABSTRACT

The invention provides conductive concrete suitable for commercial and large-scale production. The conductive concrete uses carbonaceous particles as conductive phase, to achieve concrete with resistivities as low as 2 Ωcm and compressive strengths over 30 Mpa (both measured at 28 days).

18 Claims, 2 Drawing Sheets

CONDUCTIVE CONCRETE COMPOSITION

CROSS-REFERENCE TO RELATED APPLICATION

This application claims the benefit of U.S. Provisional Application Serial No. 60/192,850 filed Mar. 29, 2000.

FIELD OF THE INVENTION

The invention relates to the field of concrete, more specifically conductive concrete.

BACKGROUND OF THE INVENTION

Conventional concrete, consisting of hydrated Portland cement with silica sand as fine aggregate and limestone, stone or other coarse aggregate, is a good electrical insulator. The electrical resistivity of conventional concrete usually ranges from about 6.54 to $11.4 \times 10^5$ Ωcm for dried concrete and about 2.5 to $4.5 \times 10^3$ Ωcm for moist concrete (conductors such as metals have resistivities in the order of $10^{-5}$ Ωcm).

For some end uses, it is desirable to have concrete that is a conductor rather than an insulator. Conductive concrete is useful as electromagnetic shielding. It is often required in the design and construction of facilities and equipment to protect electrical systems or electronic components from the effects of unwanted electromagnetic energy. Other applications are anti-static flooring in the electronic instrumentation industry and in hospitals; and cathodic protection of steel reinforcement in concrete structures. Another use for conductive concrete is for heating purposes. Slabs of conductive concrete can be used to melt snow or ice (for example on an airport runway), or for radiant indoor heating.

Conductive concrete compositions have been described in the technical and patent literature. Banthia et al, *Cem. Concr. Res.*, 22(5), 804–814 (1992), studied the electrical resistivity of carbon fiber- and steel microfiber-reinforced cements. The content of conductive fiber ranged from 1 to 5% by volume. The resistivity at 28 days of hydration ranged from 78 Ωcm to 31.92 Ωcm.

Kojima et al, *CAJ Proceedings of Cement & Concrete*, The Cement Association of Japan, No. 43, 560–565 (1989), prepared a conductive carbon fiber/cement composite by laminating six sheets of carbon fibre paper impregnated with Portland cement paste. The product was 3 mm thick and had a resistivity value of 0.7 Ωcm. The material was highly effective in electromagnetic shielding, however, the raw materials are expensive and the concrete product is not suitable for load-bearing applications.

Chiou et al, *Composites*, 20(4), 379–381 (1989), reported work on carbon fiber reinforced cement for electromagnetic shielding, with results similar to those of Banthia et al. Shintani et al, in U.S. Pat. No. 5,422,174 describe a conductive concrete for electromagnetic wave shielding; the concrete, which relies on carbon fibres as the conductive element, is spread on a panel of regular concrete or plasterboard in order to have sufficient mechanical strength for building purposes. McCormack, in U.S. Pat. No. 5,346,547 describes conductive concrete containing magnetized steel fibres. The concrete compositions described in the above-mentioned literature are useful for specific purposes; however, they all represent a compromise between high mechanical strength and conductivity.

Xie et al, in U.S. Pat. No. 5,447,564 describe a conductive concrete composition which exhibits both low resistivity (as low as 0.46 Ωcm) and high mechanical strength (over 30 Mpa).

There remains a need for conductive concrete compositions combining good mechanical strength and high electrical conductivity, suitable for commercial large-scale application.

SUMMARY OF THE INVENTION

In a first aspect, the invention provides a method for making conductive concrete, the method comprising the steps of:

(A) mixing porous conductive carbonaceous particles with water, thus forming pre-saturated carbonaceous particles;

(B) adding to the pre-saturated carbonaceous particles a cement binder, and a superplasticiser together with additional water, if required, to form a fresh concrete mixture;

(C) moulding and compacting the fresh concrete mixture; and (D) curing the compacted fresh concrete mixture.

In a second aspect, the invention provides a method for making conductive concrete, the method comprising the steps of:

(A) mixing, in any order, conductive carbonaceous particles, a cement binder, superplasticiser and water, to form a fresh concrete mixture;

(B) moulding and compacting the fresh concrete mixture; and (C) air-curing the compacted fresh concrete mixture.

DETAILED DESCRIPTION OF PREFERRED EMBODIMENTS

The method is particularly suited to large-scale commercial production of conductive concrete, using an industrial scale mixer (for example, having a capacity of about 0.08 m³ to about 12 m³). The method is suitable for conductive concrete made in drum mixers, pan mixers and high shear mixers.

Figure 1:
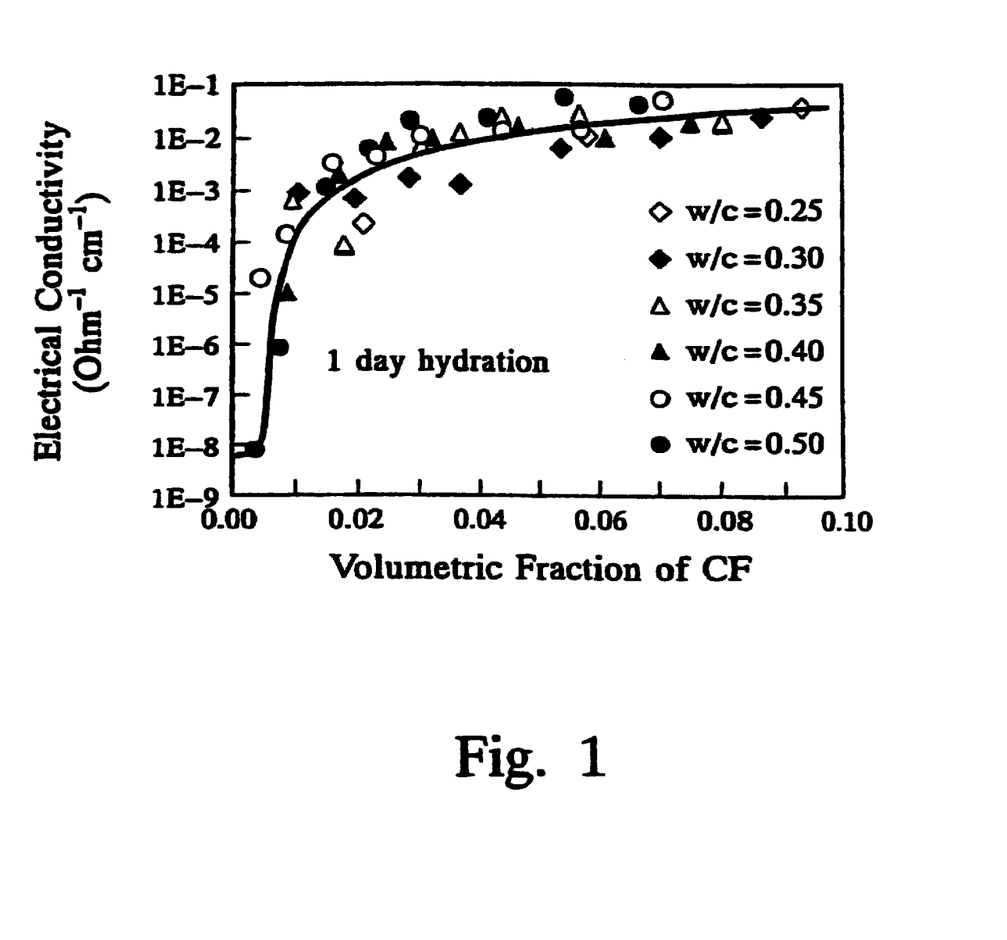
FIG. 1 is a graph showing the relationship between carbon fiber content and electrical conductivity in paste concrete, at different water/cement ratios.

In the study of carbon fiber containing conductive concrete, a particular relationship between the conductive phase content and the resistivity has been noted. The relationship has been dubbed the "percolation phenomenon". The phenomenon is illustrated in FIG. 1, which shows the relationship between carbon fiber content and conductivity for paste concrete after one day of hydration. It can be seen from the graph that at low carbon fiber content (measured as volumetric fraction), the concrete acts as an insulator. As the content of carbon fiber conductor is increased to a "threshold value", the conductivity (the inverse of resistivity, measured in $\Omega^{-1}$ cm$^{-1}$) rises dramatically, by several orders of magnitude. After the dramatic rise in conductivity, further increase in carbon fiber content leads to minimal changes in the conductivity. It is believed that at low conductor particle or fiber content, many of the conductor particles are insulated by the cement paste, and are not in electrical contact with neighbouring particles. As the conductor content is increased, the individual particles come into contact with each other, and soon form a conductive network. The threshold value is the point at which the conductor particles reach a minimum packing density to form the conductive network.

This phenomenon can be expressed by the following relation:

$$\sigma = \sigma_m (\phi - \phi_c)^t$$

where $\sigma$ and $\sigma_m$ are the conductivities of the composite (i.e. the concrete composition) and the conductive phases, respectively, $\phi$ is the volumetric fraction of the conductive phase, $\phi_c$ is the threshold value of the volumetric fraction of the conductive phase, and t is a constant.

Figure 2:
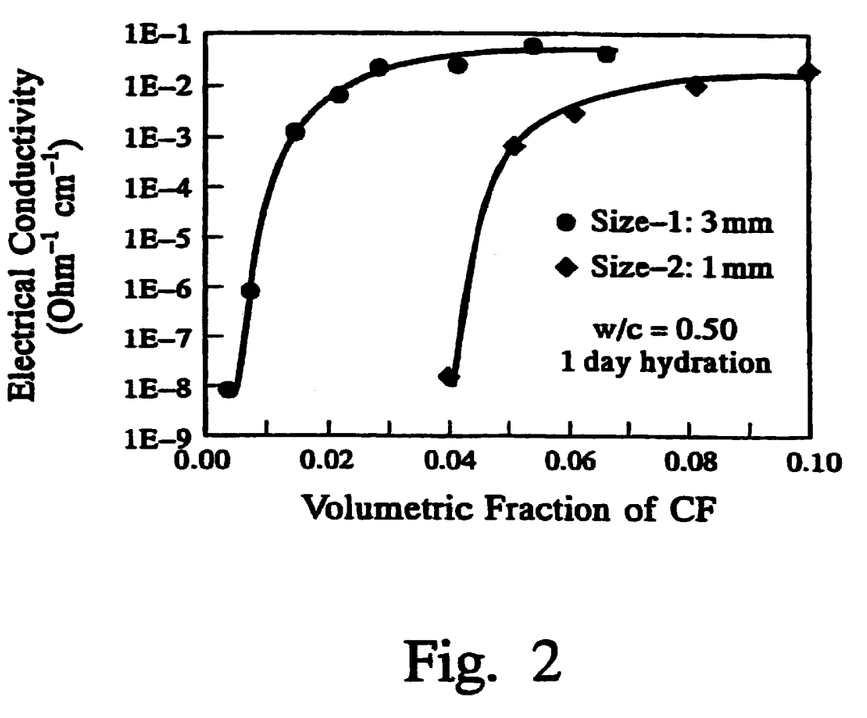
FIG. 2 is a graph showing the relationship between carbon fiber content and electrical conductivity in a paste concrete, for fibres having an average size of 3 mm and fibres having an average size of 1 mm.

The threshold value, $\phi_c$, is microstructure-dependent. One factor that influences the threshold value is the size of the particles in the conductive phase. The effect of the conductive particle size on $\phi_c$ can be seen in FIG. 2. FIG. 2 shows two curves, each showing the relationship between volumetric fraction of the conductive phase ($\phi$) and conductivity. In the first curve, the fibres of the conductive phase have an average size of 3 mm, in the second curve, the fibres have an average size of 1 mm. It can be seen that the threshold value, $\phi_c$, increases as the fiber size decreases. This can be explained by improved packing of larger particles. As the particle size increase, the surface area of each particle available for contact with its neighbouring particles increases.

The inventors have found that concrete with low resistivities and good compressive strength can be prepared using carbon particles as the conductive phase. The method of the invention is directed to concrete compositions which satisfy the conditions for percolation, and hence exhibit good conductivity. The concrete of the invention has these characteristics even when prepared on a commercial scale.

It is important, when mixing fresh concrete, to keep the water/cement ratio as low as possible, in order to yield a hardened concrete product with high compressive strength and good durability. Adding excess water can also increase the cure time of fresh concrete. However, when very low water/cement ratios are used, the fresh concrete does not flow well, making it difficult to handle and mould. In order to increase the flowability, or "slump" as it is called, as well as to lengthen the period of time the fresh concrete remains flowable (slump retention), materials called superplasticisers are added to the fresh concrete. Superplasticisers permit the mixing of fresh concrete with high slump and good slump retention, with the addition of very little water.

In conductive concrete it is also important to minimize the amount of water added to the fresh concrete, not only to achieve a high compressive strength, but also to yield a hardened concrete product with a high conductivity. As water content is increased, conductivity decreases. This is believed to be due to the contribution of water to the volume of the concrete. The presence of water essentially decreases the volume fraction of the conductive phase, thereby decreasing the conductivity.

By lowering the amount of water required to obtain a desired slump, superplasticisers can make a substantial contribution to the conductivity of hardened concrete. In the method and conductive concrete compositions of the invention it is preferred to use a superplasticiser.

Known superplasticisers fall into four groups: 1) the lignosulphonate group; 2) sulphonated synthetic polymers, such as polynaphthalene sulphonate (PNS), and polymelamine sulphonates (PMS); 3) carboxylated synthetic polymers, such as copolymers of either acrylic or methacrylic acid with hydroxyethyl- or hydroxypropyl-acrylate or methacrylate esters; and 4) polymers with mixed functionality. The inventors have found that a particularly good balance between conductivity and compressive strength is obtained using carboxylated synthetic polymers as superplasticisers. Superplasticisers are disclosed, for example in: Bradley et al; "Water Soluble Polymers: The Relationship Between Structure and Dispersing Action, and Rate of Cement Hydration"; Cem. Conc. Aggr., 8: 68–75 (1986); U.S. Pat. No. 5,362,324 (1994, to Cerulli et al); Okazawa et al; "A New Functional Polycarboxylate Based Polymer: Physical Properties of Concrete"; Concrete 2000; Dhir, R. K. and Jones M. R. (Eds); Dundee, U. K., Vol. 2, pp 1813–1824 (1993); U.S. Pat. No. 5,362,829 (1994, to Kinoshita et al); U.S. Pat. No. 5,880,182 (Mar. 9, 1999, to Minomiya et al); U.S. Pat. No. 5,753,037 (1998, to Drs et al); and Tanaka et al; "A New Polycarboxylate Based Polymer-Chemistry and Dispersing Performance"; Concrete 2000; Dhir, R. K. and Jones M. R. (Eds); Dundee, U. K., Vol. 1, pp 351–358 (1993), all of which are incorporated herein by reference. Particularly preferred is a superplasticiser of the type marketed under the name of Rheobuild 3000 FC® or polycarboxylic acid by Master Builders Technologies.

The conductive carbonaceous particles used as conductive phase in the method and concrete of the invention may be carbon from many different sources, and may take the form of chunks or fibers. Preferred conductive carbonaceous particles are "coke breeze", which is a side product of steel smelting. The particle size can influence the conductivity and the compressive strength of a hardened concrete. It is preferred that the conductive carbonaceous particles have a size within the range of from about 20 mm to about 2 $\mu$m, and particularly preferred that they have a size within the range of from about 13 mm to about 5 $\mu$m.

The particle size distribution can also influence the conductivity and compressive strength of a hardened concrete. As a percentage by weight of the total conductive phase, it is preferred that the conductive phase have the following composition: about 50 to about 70 wt % of particles from about 13 mm to about 6.4 mm in size; about 10 to about 20 wt % of particles from about 850 $\mu$m to about 250 $\mu$m in size; and about 20 to about 30 wt % of particles from about 250 $\mu$m to about 5 $\mu$m in size.

Carbonaceous materials, particularly coke breeze, are often porous, having a certain percentage of their volume taken up with air. The portion of the volume that is taken up with air is called the "open pore volume". The open pore volume can be determined simply by saturating dry coke breeze with water, and determining the increase in weight. Porous carbonaceous particles are considered to be those which when saturated with water have a water content of at least about 5 wt %. In addition to porous carbonaceous particles, non-porous carbonaceous particles (including fibres) may be added. Non-porous carbonaceous material is usually added to "replace" an equivalent volume of porous carbonaceous material. It is preferred that nonporous carbonaceous material represent no more than about 90 vol % of the total carbonaceous material present in the concrete.

A certain water/cement ratio is usually necessary in order to hydrate the cement binder. This ratio is usually in the order of about 0.2 to about 0.75, and depends on the cement binder that is used.

A preferred way for decreasing the water added to form the fresh concrete compositions of the invention, is to pre-saturate the porous conductive carbonaceous particles with water, that is, fill the open pore volume with water, prior to adding the remaining components of the fresh concrete, such as a cement binder. The quantity of water required to presaturate the porous carbonaceous particles can be calculated. This quantity is added to the porous conductive carbonaceous particles, and the water fills the open pore volume.

Commercially available coke breeze typically has an open pore volume such that when the coke breeze is saturated it has a water content of about 10 to about 25 wt %. The inventors had particular success with coke breeze that was from about 18 to about 22 wt % water when saturated. To accurately control the water content of the saturated coke breeze, it may be desirable to dry the coke breeze (commercial coke breeze can have a "natural" water content of approximately 7 to 12 wt %), and to "add back" sufficient water to the dry coke breeze to bring it to the desired range of water content. Pre-drying is optional, and unnecessary if the "natural" water content of a batch of coke breeze is established to be consistent. The cement binder and any other fresh concrete ingredients are then added to the pre-saturated coke breeze, together with an additional quantity of water, called the "immediately accessible water". The immediately accessible water is added in sufficient quantity that the fresh concrete mixture is cohesive enough to enable moulding, compacting and curing. The immediately accessible water is preferably less than that required to achieve a water/cement ratio that will fully hydrate the cement (i.e. the immediately accessible water/cement ratio should preferably be less than about 0.45). The inventors have found that with coke breeze as the porous conductive phase an immediately accessible water/cement ratio of between about 0.14 to about 0.30 is preferred. Particularly preferred is an immediately accessible water/cement ratio of approximately 0.21.

Alternatively, the amount of water required to pre-saturate the coke breeze can be added to the coke breeze together with the additional quantity of water (immediately accessible water). When this is done, no additional water need be added with the cement binder. The result of both methods is a fresh concrete mix that is quite dry. As the hydration reaction proceeds, over time the water that fills the open pore volume may be drawn out to complete the hydration reaction.

It is believed that the cured skeleton or matrix of the concrete is formed during the first 4 to 8 hours of curing. It is during this time that excess immediately accessible water will have a detrimental effect on the hardened concrete's conductivity. After this crucial period, additional water will not greatly alter the concrete matrix, and hence will have little effect on the conductivity. It is believed that the water present in the open pore volume is drawn out over a time that is considerably greater than this 4 to 8 hour period.

Mixing is preferably accomplished in any mixer and at any speed such that the carbonaceous particles are not substantially broken down. Alternatively, if the mixing method breaks down the particles, the initial size of the particles and the mixing parameters should be chosen such that the final size of particles, after mixing, is within the desired range.

Fresh concrete is usually shaped or moulded prior to hydration (hydration is also known as curing). When the fresh concrete is poured into a mould, it is usually necessary to perform some kind of "placement" procedure. This usually consists of exposing the mould or the fresh concrete itself to some kind of vibratory motion. The vibratory motion causes the fresh concrete to settle into the mould, by expelling air, and it causes the fresh concrete to form a cohesive mass. Some of the fresh concrete compositions of the invention are particularly dry textured, and do not readily cohere. For such fresh concrete compositions, the preferred placement method is compaction, using a plate compactor. Particularly preferred plate compactors have the following specifications:

Plate size: about 178,500 to about 280,000 mm$^2$; vibrating frequency: about 3,600 to about 5,600 v.p.m.; centrifugal force: about 1,030 kg to about 1,520 kg; travel speed: 20–25 m/min.; weight: about 60 kg to about 88 kg.

During compaction the fresh concrete will undergo a reduction of volume. It is preferred that the volume reduce by at least 10%, more preferred that it reduce by at least 20%, and particularly preferred that it reduce by about 30%.

After mixing and placement, the fresh concrete is left to cure, which occurs through a hydration reaction involving the cement binder. In conventional concrete methods, moist curing is used. Moist curing involves enriching the water content of the environment of the concrete. This can be done by covering the concrete with wet cloth, such as burlap, by spraying the surface of the concrete with water, or by maintaining a high air humidity level, for example by covering the fresh concrete with plastic sheets. The inventors have found that concrete having superior conductivity and high compressive strength can be obtained using a dry or air cure. This involves allowing the fresh concrete to sit in air, uncovered for at least about 4 to 8 hours.

In parallel experiments, the same fresh concrete mixture of the invention was cured by three different techniques, and the resistivity of the hardened concrete was measured. In a first experiment, the concrete was moist-cured by covering it with wet burlap and plastic. The resulting concrete had a resistivity at 28 days of 96.8 $\Omega$cm. In a second experiment, the concrete was cured by covering it with plastic sheets. The resulting concrete had a resistivity at 28 days of 34.8 $\Omega$cm. In a third experiment, the concrete was air-cured. The resulting concrete had a resistivity at 28 days of 3.2 $\Omega$cm.

It is believed that if external water is supplied to the fresh concrete during curing, the external water is taken up by the concrete and contributes to the hydration, leading ultimately to a concrete having a higher than optimum water content, hence a lower conductivity. With an air cure, the water present in the open pore volume of the conductive phase is essentially the only source of water to complete the hydration.

In a preferred embodiment of the method of the invention, the concrete is air cured for about 4 to 24 hours. Curing is then continued using moist curing techniques, for 12 hours to 28 days. It is also possible to use air curing alone. The techniques of pre-saturation and dry curing may be used either alone or in combination to make a conductive concrete of the invention.

It is possible to make pre-saturated coke breeze for subsequent storage under humidity controlled conditions (for example in sealed plastic bags), and to use it later to make the concrete compositions of the invention.

Conductivity is usually measured as resistivity (the inverse of conductivity), which is reported in $\Omega$cm. The method used to measure resistivity of the concrete of the invention is AC impedance spectroscopy. Conductive concrete, in the context of the present description, is considered to be a concrete having a resistivity (after 28 days of curing) of less than about 500 $\Omega$cm. The desired resistivity will depend on the end-use of the concrete. Also influencing this would be the geometry of the concrete product (i.e. slab or beam, etc.). Preferred for uses such as electromagnetic shielding, is concrete having a resistivity of less than about 10 Ωcm, particularly preferred is concrete having a resistivity less than about 5 Ωcm.

The cement binder used in the concrete compositions of the invention may be any cement binder that will not interfere with the conductive properties of the hardened concrete. Examples are Portland cement, high alumina cement, and mixtures of these.

In addition to conductive particles and cement binder, the concrete compositions of the invention may have other additives, provided they do not interfere with the conductive properties of the hardened concrete desired for a particular end use. These additives include those conventionally added to concrete such as sand and fine aggregate such as gravel, and other cement additives known to one skilled in the art (see for example: Franklin, A. J.; *Cement and Mortar Additives;* Noyes Data Corp., USA, 1976; Gutcho, M. H.; *Cement and Mortar Technology and Additives;* Noyes Data Corp., USA; Ramachandran, V. S.; *Concrete Admixtures Handbook;* Noyes Publications, USA, 1984; Ramachandran, V. S.; *Concrete Admixtures Handbook;* $2^{nd}$ Edition, Noyes Publications, USA, 1995, all incorporated herein by reference). With particulate additives, it is of course necessary that the conductive particles not be diluted to the point where the conductive phase is not continuous. Adding non-conductive particulate matter to a concrete composition can be used to "tune" the final concrete's conductivity to a particular level for a particular end-use. The more non-conductive matter added, the lower the conductivity.

Compressive strength was measured using a modification of ASTM # C-39 96. Rather than using moulded blocks of concrete, the concrete of the invention was compacted into slabs 24×16×2 inches and cured. The slabs were then cut into 2×2×2 inch cubes with a water-cooled diamond saw. A 2×2×2 inch cube was placed between the plattens of a testing press such that a compacted surface of the cube did not lie against the plattens.

For use in construction, it is desirable that the conductive concrete have a high compressive strength and thereby provide structural support. For uses in construction, preferably the hardened concrete of the invention has a compressive strength at 28 days of at least 15 MPa, more preferably greater than 25, and particularly preferably greater than 30.

The concrete of the invention may also be used in uses in which mechanical strength is not a priority. Examples would be: as a coating for conventional concrete and as a coating on other materials.

The concrete of the invention is considerably less dense than conventional concrete, because of the presence of porous material. Depending on the quantity of coke breeze in the concrete, it may be from about 65% to about 75% the density of conventional concrete. This makes it particularly desirable for construction. Also, because of the presence of porous material in the concrete of the invention, it is particularly suited for uses in which freeze-thaw resistance is required.

In a preferred embodiment, the mixing method of the invention is carried out as follows:

1. A desired quantity of coke particles is measured.
2. The amount of water necessary to fill the open pore volume of that portion of particles having a size over about 3 mm is calculated.
3. The amount of water necessary to achieve the desired immediately accessible water/cement ratio is calculated.
4. The amounts of water calculated in 2 and 3 are added in a mixer to the portion of coke particles having a size greater than about 3 mm.
5. Mixing is continued until a uniform consistency is obtained (about 1 to 2 minutes) (this is pre-saturation).
6. Admixtures such as a superplasticiser are added and mixing is continued for an additional 1 to 2 minutes.
7. Cement binder is added, and mixing is continued until a uniform consistency is obtained (about 3 to 5 minutes).
8. Coke particles having a size less than about 3 mm are added, and mixing is continued until a uniform consistency is obtained (about 3 to 5 minutes).
9. Carbonaceous fibres are added if desired.
10. The fresh concrete mixture is mixed for about 10 minutes.

The concrete of the invention is particularly suited for uses in which a combination of structural strength and integrity and high conductivity is required. Examples include electromagnetic shielding, antistatic flooring, and cathodic protection of steel concrete structures. Another use is in heating for the purposes of melting snow and ice, or for indoor radiant heating.

The method and concrete compositions of the invention will be further illustrated by the following examples.

EXAMPLE 1

The components (listed as parts by weight based on 1 part by weight cement) of various fresh concrete compositions and the resistivity (at various frequencies) and compressive strength (at 7 and 28 days) of the resulting hardened concrete are listed in Table 1. As is the conventional practice, in some of the concrete compositions a portion of the cement is replaced with silica fume. In those concrete mixtures, the sum of cement plus silica fume equals 1 part, and the rest of the composition is reported as parts by weight with respect to the sum of cement and silica fume.

The mixing protocol was as follows, except where otherwise noted:

1. The desired quantity of coke particles is measured.
2. The amount of water necessary to fill the open pore volume of that portion of particles having a size over about 3 mm is calculated.
3. The amount of water necessary to achieve the desired immediately accessible water/cement ratio is calculated.
4. The amounts of water calculated in 2 and 3 are added in a 3 $ft^3$ mixer to the portion of coke particles having a size greater than about 3 mm.
5. Mixing is continued until a uniform consistency is obtained (about 1 to 2 minutes) (presaturation). Mixing speed is approximately 18 rpm.
6. Superplasticiser is added, along with various other additives and mixing is continued for an additional 1 to 2 minutes.
7. Cement binder (is added, and mixing is continued until a uniform consistency is obtained (about 3 to 5 minutes).
8. Coke particles having a size less than about 3 mm are added, and mixing is continued until a uniform consistency is obtained (about 3 to 5 minutes).
9. Carbonaceous fibres are added if desired.
10. The fresh concrete mixture is mixed for about 10 minutes.

Except where otherwise indicated, the fresh concrete was poured into a mould and compacted by a single pass with a plate compacter having the following specifications:

| | | |
|---|---|---|
| Plate size: 510 × 350 mm | OR | Plate size: 500 × 560 mm |
| Vibrating frequency: 5,600 Hz | OR | Vibrating frequency: 3,600 Hz |
| Centrifugal force: 1,030 kg | OR | Centrifugal force: 1,520 Kg |
| Travel speed: 20–25 m/min | OR | Travel speed: 25 m/min |
| Weight: 60 kg | OR | Weight: 88 kg |

For some examples curing was done using a conventional moist cure, with either wet burlap or plastic. In others, an air cure was used.

The hardened concrete compositions were tested at 10 KHz, 1 KHz and 63 Hz for resistivity at 1 day, 7 days, 14 days and 28 days. Testing was done using AC impedance spectroscopy with Solartron™ 1260 AC impedance analyser, with an SL 21603 test module. Compressive strength was measured using a modification of ASTM # C-39 96. The cured concrete was cut into 2×2×2 inch cubes prior to testing. Compressive strength was measured at 7 and 28 days.

The components of the various concrete mixtures and the conductivity and compressive strength results are listed in Table 1, wherein the numerical values are listed as parts by weight, based on one part cement (or one part cement+silica fume). The water is any additional water added to the mixture, the rotations ½×¼ and ⅛×0 indicate particle size ranges for coke breeze in inches, while 10×20, 20×65 and 65×0 are mesh sizes for coke breeze. Coke Saturation % indicates the amount of water added as a percentage of the weight of coke with a particle size greater than about 3 mm.

Two mixing sequences were used. In Sequence 1, pre-saturated coke particles were mixed with water, additive such as superplasticiser were added and cement binder was added. In Sequence 2, a dry mixture of dry ingredients was prepared, followed by addition of water and additives.

Consolidation 1 is a compaction using a plate compactor, while Consolidation 2 is a compaction using a rod vibrator.

TABLE 1

| Mix # | 92B | 95B | 96B | 103B | 104B | 105B | 106B | 126B |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.214 | 0.214 | 0.214 | 0.214 | 0.250 | 0.214 | 0.250 | 0.214 |
| ½ × ¼, dry | 1.050 | 1.050 | 1.050 | 1.155 | 1.155 | 1.155 | 1.155 | 1.260 |
| ⅛ × 0 | | | | | | | | |
| 10 × 20 | 0.105 | 0.105 | 0.105 | 0.105 | 0.105 | 0.105 | 0.105 | |
| 20 × 65 | 0.630 | 0.630 | 0.630 | 0.630 | 0.630 | 0.210 | 0.210 | 0.210 |
| 65 × 0 | 0.315 | 0.315 | 0.315 | 0.210 | 0.210 | 0.630 | 0.630 | 0.630 |
| Limestone ⅜ | | | | | | | | |
| Concrete Sand | | | | | | | | |
| Carbon fiber 3 mm | | | | | | | | |
| Carbon fiber 125 mm | | | | | | | | |
| Rheobuild 3000 FC | 0.008 | 0.008 | 0.008 | 0.008 | 0.008 | 0.008 | 0.008 | 0.008 |
| Disal | | | | | | | | |
| Eucoflow 346 | | | | | | | | |
| Rheobuild 2000 B | | | | | | | | |
| Conchem 25 XL | | | | | | | | |
| Coke Sat % | 18.0 | 18.0 | 18.0 | 18.0 | 18.0 | 18.0 | 18.0 | 18.0 |
| Mix sequence | 1 | 1 | 1 | 1 | 1 | 1 | 1 | 1 |
| Mixer Size m³ | 0.255 | 0.255 | 0.255 | 0.255 | 0.255 | 0.255 | 0255 | 0.255 |
| Consolidation | 1 | 1 | 1 | 1 | 1 | 1 | 1 | 1 |
| Curing | Burlap & Plastic | Plastic | Air | Air | Air | Air | Air | Air |
| Comp St 28D (Mpa) | 18.1 | 17.1 | 21.1 | 30.2 | 30.5 | 35.3 | 36.7 | 34.0 |
| 28 Day Resistivity at 63 Hz (Ωcm) | 96.8 | 34.8 | 3.2 | 1.7 | 11.9 | 5.5 | 3.6 | 1.5 |

| Mix # | 97B | 131B | 130B | 108B | 107B | 109B | 102B |
|---|---|---|---|---|---|---|---|
| Cement | 1.000 | 1.000 | 1.000 | 1.000 | 1.000 | 1.000 | 1.000 |
| Silica Fume | | | | | | | |
| Water | 0.214 | 0.190 | 0.230 | 0.214 | 0.214 | 0.214 | 0.214 |
| ½ × ¼, dry | 1.260 | 1.260 | 1.260 | 1.260 | 1.260 | 1.260 | 1.260 |
| ⅛ × 0 | | | | | | | |
| 10 × 20 | | | | | | | |
| 20 × 65 | 0.210 | 0.210 | 0.210 | 0.210 | 0.210 | 0.210 | 0.630 |
| 65 × 0 | 0.630 | 0.630 | 0.630 | 0.630 | 0.630 | 0.630 | 0.210 |
| Limestone ⅜ | | | | | | | |
| Concrete Sand | | | | | | | |
| Carbon fiber 3 mm | | | | | | | |
| Carbon fiber 125 mm | | | | | | | |
| Rheobuild 3000 FC | 0.008 | 0.008 | 0.008 | 0.008 | 0.008 | 0.008 | 0.008 |
| Disal | | | | | | | |
| Eucoflow 346 | | | | | | | |
| Rheobuild 2000 B | | | | | | | |
| Conchem 25 XL | | | | | | | |
| Coke Sat % | 21.0 | 18.0 | 18.0 | 18.0 | 18.0 | 18.0 | 18.0 |
| Mix sequence | 1 | 1 | 1 | 1 | 1 | 1 | 1 |
| Mixer Size m³ | 0.255 | 0.255 | 0.255 | 0.255 | 0.255 | 0.255 | 0.255 |
| Consolidation | 1 | 1 | 1 | 1 | 1 | 1 | 1 |
| Curing | Air | Air | Air | 4 hr air then plastic | 8 hr air then plastic | 24 hr air then plastic | Air |

TABLE 1-continued

| | | | | | | | | |
|---|---|---|---|---|---|---|---|---|
| Comp St 28D | 34.3 | 32.3 | 31.8 | 38.8 | 35.2 | | 37.1 | 32.2 |
| 28 Day Resistivity at 63 Hz | 1.8 | 2.0 | 2.2 | 7.7 | 2.5 | | 2.8 | 3.1 |

| Mix # | 110B | 111B | 112B | 113B | 114B | 115B | 116B | 117B |
|---|---|---|---|---|---|---|---|---|
| Cement | 1.000 | 1.000 | 1.000 | 1.000 | 1.000 | | 1.000 | 1.000 |
| Silica Fume | | | | | | 1.000 | | |
| Water | 0.214 | 0.214 | 0.214 | 0.214 | 0.250 | 0.214 | 0.214 | 0.214 |
| ½ × ¼, dry | 1.260 | 1.260 | 1.260 | 1.260 | 1.260 | 1.260 | 1.197 | 1.130 |
| ⅛ × 0 | | | | | | | | |
| 10 × 20 | | | | | | | | |
| 20 × 65 | 0.210 | 0.210 | 0.420 | 0.210 | 0.210 | 0.210 | 0.210 | 0.210 |
| 65 × 0 | 0.630 | 0.630 | 0.420 | 0.630 | 0.630 | 0.630 | 0.630 | 0.630 |
| Limestone ⅜ | | | | | | | 0.063 | 0.126 |
| Concrete Sand | | | | | | | | |
| Carbon fiber 3 mm | | | | | | | | |
| Carbon fiber 125 mm | | | | | | | | |
| Rheobuild 3000 FC | 0.006 | 0.004 | 0.008 | 0.002 | 0.002 | 0.008 | 0.008 | 0.008 |
| Conchem 25 XL | | | | | | | | |
| Eucoflow 346 | | | | | | | | |
| Rheobuild 2000 B | | | | | | | | |
| Conchem 25 XL | | | | | | | | |
| Coke Sat % | 18.0 | 18.0 | 18.0 | 18.0 | 18.0 | 18.0 | 18.0 | 18.0 |
| Mix sequence | 1 | 1 | 1 | 1 | 1 | 1 | 1 | 1 |
| Mixer Size m³ | 0.255 | 0.255 | 0.255 | 0.255 | 0.255 | 0.255 | 0.255 | 0.255 |
| Consolidation | 1 | 1 | 1 | 1 | 1 | 1 | 1 | 1 |
| Curing | Air | Air | Air | Air | Air | Air | Air | Air |
| Comp St 28D | 31.2 | 29.0 | 31.0 | 14.2 | 27.0 | 37.7 | 34.7 | 34.1 |
| 28 Day Resistivity at 63 Hz | 2.0 | 3.8 | 2.0 | 14.0 | 7.0 | 1.6 | 1.8 | 2.1 |

| Mix # | 120B | 121B | 118B | 119B | 122B | 132B | 133B | 134B |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.214 | 0.214 | 0.214 | 0.214 | 0.214 | 0.214 | 0.214 | 0.214 |
| ½ × ¼, dry | 1.260 | 1.050 | 1.260 | 1.260 | 1.260 | 1.260 | 1.260 | 1.260 |
| ⅛ × 0 | 0.840 | 1.050 | | | | | | |
| 10 × 20 | | | | | | | | |
| 20 × 65 | | | 0.200 | 0.189 | 0.350 | 0.189 | 0.168 | 0.084 |
| 65 × 0 | | | 0.599 | 0.567 | | 0.567 | 0.504 | 0.252 |
| Limestone ⅜ | | | | | | | | |
| Concrete Sand | | | 0.042 | 0.064 | 0.840 | 0.168 | 0.441 | 1.008 |
| Carbon fiber 3 mm | | | | | | | | |
| Carbon fiber 125 mm | | | | | | | | |
| Rheobuild 3000 FC | 0.008 | 0.008 | 0.008 | 0.008 | 0.008 | 0.008 | 0.008 | 0.008 |
| Eucoflow 346 | | | | | | | | |
| Rheobuild 2000 B | | | | | | | | |
| Conchem 25 XL | | | | | | | | |
| Coke Sat % | 18.0 | 18.0 | 18.0 | 18.0 | 18.0 | 18.0 | 18.0 | 18.0 |
| Mix sequence | 1 | 1 | 1 | 1 | 1 | 1 | 1 | 1 |
| Mixer Size m³ | 0.255 | 0.255 | 0.255 | 0.255 | 0.255 | 0.255 | 0.255 | 0.255 |
| Consolidation | 1 | 1 | 1 | 1 | 1 | 1 | 1 | 1 |
| Curing | Air | Air | Air | Air | Air | Air | Air | Air |
| Comp St 28D | 28.8 | 27.5 | 29.7 | 32.5 | 26.0 | 30.6 | 31.4 | 31.5 |
| 28 Day Resistivity at 63 Hz | 1.5 | 1.9 | 2.2 | 2.4 | 50.0 | 1.8 | 2.0 | 9.3 |

| Mix # | 137B | 139B | 135B | 138B | 140B | 141B | 142B | 143B |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.170 | 0.160 | 0.214 | 0.140 | 0.120 | 0.080 | 0.214 | 0.214 |
| ½ × ¼, dry | 1.260 | 1.260 | 1.260 | 1.260 | 1.260 | 1.260 | 1.260 | 1.260 |
| ⅛ × 0 | | | | | | | | |
| 10 × 20 | | | | | | | | |
| 20 × 65 | 0.084 | 0.084 | 0.004 | 0.042 | 0.042 | | 0.210 | 0.210 |
| 65 × 0 | 0.252 | 0.252 | 0.126 | 0.126 | 0.126 | | 0.630 | 0.630 |
| Limestone ⅜ | | | | | | | | |
| Concrete Sand | 1.008 | 1.008 | 1.344 | 1.344 | 1.344 | 1.680 | | |
| Carbon fiber 3 mm | | | | | | | | |
| Carbon fiber 125 mm | | | | | | | | |
| Rheobuild 3000 FC | 0.008 | 0.008 | 0.008 | 0.008 | 0.008 | 0.008 | 0.008 | 0.008 |
| Disal | | | | | | | | |
| Eucoflow 348 | | | | | | | | |
| Rheobuild 2000 B | | | | | | | | |
| Conchem 25 XL | | | | | | | | |

TABLE 1-continued

| | | | | | | | | |
|---|---|---|---|---|---|---|---|---|
| Coke Sat % | 18.0 | 18.0 | 18.0 | 18.0 | 18.0 | 18.0 | 18.0 | 18.0 |
| Mix sequence | 1 | 1 | 1 | 1 | 1 | 1 | 1 | 1 |
| Mixer Size m³ | 0.255 | 0.255 | 0.255 | 0.255 | 0.255 | 0.255 | 0.255 | 0.255 |
| Consolidation | 1 | 1 | 1 | 1 | 1 | 1 | 1 | 1 |
| Curing | Air | Air | Air | Air | Air | Air | Air | Air |
| Comp St 28D | 29.4 | 38.8 | 29.8 | 28.3 | 30.9 | 29.7 | 34.8 | 32.5 |
| 28 Day Resistivity at 63 Hz | 8.1 | 3.5 | 27.1 | 5.3 | 6.7 | 18.6 | 2.1 | 2.0 |

| Mix # | 144B | 145B | 146B | 148B | 149B | 150B | 60 min final mix time 151B | 30 min final mix time 152B |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.214 | 0.214 | 0.214 | 0.214 | 0.214 | 0.214 | 0.214 | 0.214 |
| ½ × ¼, dry | 1.103 | 0.945 | 0.630 | 0.945 | 0.630 | 1.260 | 1.260 | 1.260 |
| ⅛ × 0 | | | | | | | | |
| 10 × 20 | | | | | | | | |
| 20 × 65 | 0.210 | 0.210 | 0.210 | 0.210 | 0.210 | 0.210 | 0.210 | 0.210 |
| 65 × 0 | 0.630 | 0.630 | 0.630 | 0.630 | 0.630 | 0.630 | 0.630 | 0.630 |
| Limestone ⅜ | 0.441 | 0.880 | 1.764 | 0.882 | 1.764 | | | |
| Concrete Sand | | | | | | | | |
| Carbon fiber 3 mm | | | | | | | | 0.010 |
| Carbon fiber 125 mm | | | | | | | | 0.020 |
| Rheobuild 3000 FC | 0.008 | 0.008 | 0.008 | 0.008 | 0.008 | 0.008 | 0.008 | 0.008 |
| Disal | | | | | | | | |
| Eucoflow 346 | | | | | | | | |
| Rheobuild 2000 B | | | | | | | | |
| Conchem 25 XL | | | | | | | | |
| Coke Sat % | 18.0 | 18.0 | 18.0 | 18.0 | 18.0 | 18.0 | 18.0 | 18.0 |
| Mix sequence | 1 | 1 | 1 | 1 | 1 | 2 | 2 | 1 |
| Mixer, Size m³ | 0.255 | 0.255 | 0.255 | 0.255 | 0.255 | 0.255 | 0.255 | 0.255 |
| Consolidation | 1 | 1 | 1 | 1 | 1 | 2 | 1 | 1 |
| Curing | Air | Air | Air | Air | Air | Air | Air | Air |
| Comp St 28D | 37.8 | 33.0 | 18.3 | 28.3 | 35.0 | 22.2 | 28.3 | 9.4 |
| 28 Day Resistivity at 63 Hz | 2.0 | 3.4 | 9.5 | 3.9 | 15.5 | 3.2 | 1.9 | 3.0 |

| Mix # | 153B | 154B | 155B | 156B | 158B | 159B | 160B | 161B |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.214 | 0.214 | 0.214 | 0.214 | 0.214 | 0.214 | 0.214 | 0.214 |
| ½ × ¼, dry | 1.260 | 1.260 | 1.260 | 1.260 | 1.260 | 1.103 | 1.103 | 1.103 |
| ⅛ × 0 | | | | | | | | |
| 10 × 20 | | | | | | | | |
| 20 × 65 | 0.210 | 0.210 | 0.210 | 0.210 | 0.120 | 0.189 | 0.155 | 0.084 |
| 65 × 0 | 0.630 | 0.630 | 0.630 | 0.630 | 0.630 | 0.567 | 0.464 | 0.252 |
| Limestone ⅜ | | | | | | 0.441 | 0.441 | 0.441 |
| Concrete Sand | | | | | | 0.168 | 0.441 | 1.008 |
| Carbon fiber 3 mm | | | | | | | | |
| Carbon fiber 125 mm | | | | | | | | |
| Rheobuild 3000 FC | | | | | | 0.008 | 0.008 | 0.008 |
| Disal | | | | 0.015 | | | | |
| Eucoflow 346 | 0.0134 | 0.010 | 0.0067 | | | | | |
| Rheobuild 2000 B | | | | | 0.010 | | | |
| Conchem 25 XL | | | | | 0.0025 | | | |
| Coke Sat % | 346 | 346 | 346.0 | | & | 18.0 | 18.0 | 18.0 |
| Max sequence | 1 | 1 | 1 | 1 | 1 | 1 | 1 | 1 |
| Mixer Size m³ | 0.255 | 0.255 | 0.255 | 0.255 | 0.255 | 0.255 | 0.255 | 0.255 |
| Consolidation | 1 | 1 | 1 | 1 | 1 | 1 | 1 | 1 |
| Curing | Air | Air | Air | Air | Air | Air | Air | Air |
| Comp St 28D | 27.7 | 26.0 | 22.8 | 24.1 | 21.0 | 22.8 | 25.1 | 25.4 |
| 28 Day Resistivity at 63 Hz | 2.4 | 2.2 | 3.0 | 5.9 | 6.1 | 2.7 | 3.9 | 8.3 |

| Mix # | 162B | 163B | 164B | 165B | 166B | 167B | Plant 2 | Plant 3 |
|---|---|---|---|---|---|---|---|---|
| Cement | 1.000 | 1.000 | 1.000 | 1.000 | 1.000 | 1.000 | 1.000 | 1.000 |
| Silica Fume | | | | | | | | |
| Water | 0.214 | 0.214 | 0.214 | 0.214 | 0.214 | 0.214 | 0.201 | 0.232 |
| ½ × ¼, dry | 0.945 | 0.945 | 0.945 | 0.630 | 0.630 | 0.630 | 1.247 | 1.220 |
| ⅛ × 0 | | | | | | | | |
| 10 × 20 | | | | | | | | |
| 20 × 65 | 0.189 | 0.155 | 0.084 | 0.189 | 0.155 | 0.084 | 0.206 | 0.207 |
| 65 × 0 | 0.567 | 0.464 | 0.252 | 0.567 | 0.464 | 0.252 | 0.603 | 0.607 |
| Limestone ⅜ | 0.880 | 0.880 | 0.881 | 1.764 | 1.784 | 1.764 | | |

TABLE 1-continued

| | | | | | | | | |
|---|---|---|---|---|---|---|---|---|
| Concrete Sand | 0.168 | 0.441 | 1.008 | 0.168 | 0.441 | 1.008 | | |
| Carbon fiber 3 mm | | | | | | | | |
| Carbon fiber 125 mm | | | | | | | | |
| Rheobuild 3000 FC | 0.008 | 0.008 | 0.008 | 0.008 | 0.008 | 0.008 | 0.007 | 0.007 |
| Disal | | | | | | | | |
| Eucoflow 346 | | | | | | | | |
| Rheobuild 2000 B | | | | | | | | |
| Conchem 25 XL | | | | | | | | |
| Coke Sat % | 18.0 | 18.0 | 18.0 | 18.0 | 18.0 | 18.0 | 18.0 | 18.0 |
| Mix sequence | 1 | 1 | 1 | 1 | 1 | 1 | 1 | 1 |
| Mixer Size m³ | 0.255 | 0.255 | 0.255 | 0.255 | 0.255 | 0.255 | 7 | 7 |
| Consolidation | 1 | 1 | 1 | 1 | 1 | 1 | 1 | 1 |
| Curing | Air | Air | Air | Air | Air | Air | Air | Air |
| Comp St 28D | 27.7 | 27.1 | 26.5 | 21.1 | 24.9 | 27.8 | 39.5 | 39.0 |
| 28 Day Resistivity at 63 Hz | 6.6 | 6.4 | 16.6 | 16.6 | 27.6 | 215.6 | 4.4 | 5.3 |

| Mix # | Plant 6 | Plant 8 | Plant 9 |
|---|---|---|---|
| Cement | 1.000 | 1.000 | 1.000 |
| Silica Fume | | | |
| Water | 0.188 | 0.188 | 0.185 |
| ½ × ¼, dry | 1.250 | 1.260 | 0.938 |
| ⅛ × 0 | | | |
| 10 × 20 | | | |
| 20 × 65 | 0.417 | 0.164 | 0.211 |
| 65 × 0 | 0.417 | 0.505 | 0.618 |
| Limestone ⅜ | | | 0.897 |
| Concrete Sand | | 0.443 | |
| Carbon fiber 3 mm | | | |
| Carbon fiber 125 mm | | | |
| Rheobuild 3000 FC | 0.008 | 0.008 | 0.008 |
| Disal | | | |
| Eucoflow 346 | | | |
| Rheobuild 2000 B | | | |
| Conchem 25 XL | | | |
| Coke Sat % | 18.0 | 18.0 | 18.0 |
| Mix sequence | 1 | 1 | 1 |
| Mixer Size m³ | 7 | 7 | 7 |
| Consolidation | 1 | 1 | 1 |
| Curing | Air | Air | Air |
| Comp St 28D | 36.4 | 37.7 | 29.2 |
| 28 Day Resistivity at 63 Hz | 3.3 | 6.1 | 11.4 |

What is claimed is:

1. A method for making conductive concrete, the method comprising the steps of:

(A) mixing coarse porous conductive coke aggregate particles with water to form pre-saturated coke particles, said coke particles having particle sizes greater than 3 mm and an open pore volume that when saturated have a water content of about 10 to about 25%;

(B) adding to the pre-saturated coke particles a superplasticiser and mixing to disperse the superplasticiser;

(C) adding a Portland cement binder to the superplasticiser treated pre-saturated coke particles and mixing to form an aqueous concrete mixture having a weight ratio of water to cement binder of about 0.2 to 0.75;

(D) adding to said aqueous concrete mixture fine conductive coke aggregate particles having particle sizes less than 3 mm and mixing to form a moldable concrete mixture in which the coarse conductive coke particles comprise at least 50% by weight of the total conductive coke particles;

(E) molding the moldable concrete mixture with compaction and vibration; and (F) curing the compacted concrete mixture by air-drying for at least about four hours.

2. A method according to claim 1, wherein water is added to the concrete mixture in sufficient quantity to yield a final weight ratio of water/cement binder of from about 0.2 to about 0.75.

3. A method according to claim 1, wherein the conductive coke particles are coke breeze particles.

4. A method according to claim 3, wherein the coke breeze particles are a mixture of particles having the following size range distribution:
   about 50 to about 70 wt % of coarse particles from about 13 mm to about 6.4 mm in size;
   about 10 to about 20 wt % of fine particles from about 850 μm to about 250 μm in size; and
   about 20 to about 30 wt % of fine particles from about 250 μm to about 5 μm in size.

5. A method according to claim 1, wherein the compacting is carried out with a plate compactor.

6. A method according to claim 1, wherein during compaction, the fresh concrete mixture is compressed by about 30% of its original volume.

7. A method according to claim 1, wherein the superplasticiser is a polycarboxylated polymer.

8. A method according to claim 1, wherein the superplasticiser is a polymer of monomers selected from the group consisting of acrylic acid, methacrylic acid, hydroxy-ethyl acrylate, hydroxy-propyl acrylate, and mixtures thereof.

9. A method according to claim 1, wherein the resistivity of the conductive concrete after 28 days of curing is less than about 50 Ωcm.

10. A method according to claim 1, wherein the resistivity of the conductive concrete after 28 days of curing is less than about 5 Ωcm.

11. A method according to claim 1, wherein said coarse particles have sizes in the range of about 3–20 mm.

12. A method according to claim 11, wherein said coarse particles have sizes in the range of about 6.4–13 mm.

13. A method according to claim 1, wherein said fine particles have sizes in the range of about 2 μm to 3 mm.

14. A method according to claim 13, wherein said fine particles have sizes in the range of about 5 μm to 3 mm.

15. A conductive concrete composition made by the method comprising the steps of:
- (A) mixing coarse porous conductive coke aggregate particles with water to form pre-saturated coke particles, said coke particles having particle sizes greater than 3 mm and an open pore volume that when saturated have a water content of about 10 to about 25%;
- (B) adding to the pre-saturated coke particles a superplasticiser and mixing to disperse the superplasticiser;
- (C) adding a Portland cement binder to the superplasticiser treated pre-saturated coke particles and mixing to form an aqueous concrete mixture having a weight ratio of water to cement binder of about 0.2 to 0.75;
- (D) adding to said aqueous concrete mixture fine conductive coke aggregate particles having particle sizes less than 3 mm and mixing to form a moldable concrete mixture in which the coarse conductive coke particles comprise at least 50% by weight of the total conductive coke particles;
- (E) molding the moldable concrete mixture with compaction and vibration; and
- (F) curing the compacted concrete mixture by air-drying for at least about four hours.

16. A conductive concrete composition made by the method according to claim 15, wherein the conductive coke particles are coke breeze particles.

17. The composition made according to claim 15, wherein said coarse particles have sizes in the range of about 3–20 mm.

18. The composition made according to claim 15, wherein said fine particles have sizes in the range of about 2 μm to 3 mm.

* * * * *